(12) United States Patent
Saito et al.

(10) Patent No.: US 11,539,173 B2
(45) Date of Patent: Dec. 27, 2022

(54) TERMINAL EQUIPPED ELECTRIC WIRE AND METHOD OF FIXING SENSOR

(71) Applicant: YAZAKI CORPORATION, Tokyo (JP)

(72) Inventors: Akihiro Saito, Kakegawa (JP); Tsutomu Sawada, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 160 days.

(21) Appl. No.: 17/167,102

(22) Filed: Feb. 4, 2021

(65) Prior Publication Data

US 2021/0242637 A1 Aug. 5, 2021

(30) Foreign Application Priority Data

Feb. 4, 2020 (JP) .............................. JP2020-017192

(51) Int. Cl.
| | |
|---|---|
| *H01R 13/66* | (2006.01) |
| *H01R 4/72* | (2006.01) |
| *B60L 53/16* | (2019.01) |
| *B60L 53/18* | (2019.01) |
| *H02J 7/00* | (2006.01) |
| *H01R 13/04* | (2006.01) |

(52) U.S. Cl.
CPC .......... *H01R 13/6683* (2013.01); *B60L 53/16* (2019.02); *B60L 53/18* (2019.02); *H01R 4/72* (2013.01); *H02J 7/0042* (2013.01); *H01R 13/04* (2013.01); *H01R 2201/26* (2013.01)

(58) Field of Classification Search
None
See application file for complete search history.

(56) References Cited

U.S. PATENT DOCUMENTS

| | | | | | |
|---|---|---|---|---|---|
| 4,370,518 | A | * | 1/1983 | Guzy ....................... | H01R 4/72 156/49 |
| 4,756,781 | A | * | 7/1988 | Etheridge ................ | H05B 3/06 156/244.11 |
| 5,047,594 | A | * | 9/1991 | Powell ..................... | H01R 4/70 29/869 |
| 7,373,054 | B2 | * | 5/2008 | Stix ....................... | H01R 13/523 385/100 |

(Continued)

FOREIGN PATENT DOCUMENTS

JP 2019-500733 A 1/2019

*Primary Examiner* — Felix O Figueroa
(74) *Attorney, Agent, or Firm* — Kenealy Vaidya LLP (57) ABSTRACT

A terminal equipped electric wire includes an electric wire including: a conductor and an insulating sheath covering the conductor, a part of the conductor extending out of an end portion of the insulating sheath being an exposed portion, a terminal fitting having an electric wire connection portion at a rear side of the terminal fitting, the electric wire connection portion being connected to the exposed portion, a water stop shrinkable tube covering the electric wire connection portion connected to the exposed portion in a watertight manner, a sensor disposed on an outer surface of the water stop shrinkable tube, the sensor contacting the outer surface of the water stop shrinkable tube and a sensor fixing shrinkable tube covering and fixing the sensor on the outer surface of the water stop shrinkable tube.

9 Claims, 6 Drawing Sheets

(56) References Cited

U.S. PATENT DOCUMENTS

| | | | | |
|---|---|---|---|---|
| 9,018,528 | B2* | 4/2015 | Kakuta | H01B 7/282 |
| | | | | 427/512 |
| 9,219,318 | B2* | 12/2015 | Portas | H01R 4/72 |
| 10,407,000 | B2* | 9/2019 | Araki | H01R 4/021 |
| 10,644,462 | B2* | 5/2020 | Shimizu | H01R 4/72 |
| 2019/0036278 | A1 | 1/2019 | Shimizu et al. | |

* cited by examiner

TERMINAL EQUIPPED ELECTRIC WIRE AND METHOD OF FIXING SENSOR

CROSS-REFERENCE TO RELATED APPLICATION

The present application claims priority to Japanese Patent Application No. 2020-017192 filed on Feb. 4, 2020, the entire content of which is incorporated herein by reference.

TECHNICAL FIELD

The present invention relates to a terminal equipped electric wire and a method of fixing a sensor.

BACKGROUND

A terminal fitting formed of a conductive metal and attached to an end portion of an electric wire is mounted to a charging connector for charging a battery mounted on an electric vehicle or a hybrid vehicle. When a battery of the charging connector is charged, since a high current may flow, the charging connector and an electric wire may get hot. If the electric wire and the charging connector get too hot, an electrical resistance may increase, and the charging connector, the electric wire, or other components may be damaged.

Therefore, when the battery is charged, it is required to conduct highly reliable measurement of states occurring in the charging connector in order to shorten charging time when a high current flows and at the same time, to avoid problems that may occur during charging (such as an undesirably high temperature). Therefore, a sensor is mounted to the terminal fitting attached to the end portion of the electric wire, and a state of the terminal fitting such as a temperature, vibration, and humidity is detected (see WO2017137826A1 for example).

In the related art charging connector, the sensor is attached to the terminal fitting by a shrinkable tube. The sensor can be easily and mechanically attached to a predetermined position of the terminal fitting by the shrinkable tube. Accordingly, the sensor can be well coupled to the terminal fitting. Further, the shrinkable tube is attached to a press-bonded portion (electric wire connection portion) of the terminal fitting so as to cover a region including an exposed portion of a core wire (conductor) extending from an end portion of an insulating sheath of the electric wire. Accordingly, the shrinkable tube can ensure electrical insulation and insulation against humidity or moisture in the electric wire connection portion of the terminal fitting and in a periphery of the electric wire connection portion.

However, since the shrinkable tube is attached to collectively cover the electric wire connection portion of the terminal fitting and the sensor, a cross-sectional shape of the shrinkable tube after shrinkage is deformed from a circular shape. Therefore, there are problems that a gap is likely to occur between the electric wire connection portion of the terminal fitting and the shrinkable tube, and it is difficult to perform sealing by the shrinkable tube for corrosion prevention, water stoppage, and the like. In addition, when the electric wire connection portion of the terminal fitting and the sensor are collectively covered with the shrinkable tube, there are problems that it is difficult to know a fixed position of the sensor from an external appearance, and it is difficult to confirm whether the sensor is at a specified position.

SUMMARY

Illustrative aspects of the present invention provide a terminal equipped electric wire and a method of fixing a sensor that improve waterproofness and holding reliability of the sensor.

According to an illustrative aspect of the present invention, a terminal equipped electric wire includes an electric wire including: a conductor and an insulating sheath covering the conductor, a part of the conductor extending out of an end portion of the insulating sheath being an exposed portion, a terminal fitting having an electric wire connection portion at a rear side of the terminal fitting, the electric wire connection portion being connected to the exposed portion, a water stop shrinkable tube covering the electric wire connection portion connected to the exposed portion in a watertight manner, a sensor disposed on an outer surface of the water stop shrinkable tube, the sensor contacting the outer surface of the water stop shrinkable tube and a sensor fixing shrinkable tube covering and fixing the sensor on the outer surface of the water stop shrinkable tube.

According to another illustrative aspect of the present invention, a method of fixing a sensor includes connecting an exposed portion of a conductor of an electric wire to an electric wire connection portion of a terminal fitting, the electric wire connection portion being at a rear side of the terminal fitting, the exposed portion extending out of an end portion of an insulating sheath of the electric wire, disposing a water stop shrinkable tube on the electric wire to cover the electric wire connection portion connected to the exposed portion, heating the water stop shrinkable tube such that the water stop shrinkable tube covers the electric wire connection portion in a watertight manner, disposing a sensor on an outer surface of the water stop shrinkable tube such that the sensor contacts the outer surface of the water stop shrinkable tube, disposing a sensor fixing shrinkable tube to cover the sensor disposed on the outer surface of the water stop shrinkable tube and fixing the sensor on the outer surface of the water stop shrinkable tube by heating the sensor fixing shrinkable tube.

Other aspects and advantages of the invention will be apparent from the following description, the drawings and the claims.

DESCRIPTION OF EMBODIMENTS

Figure 1:
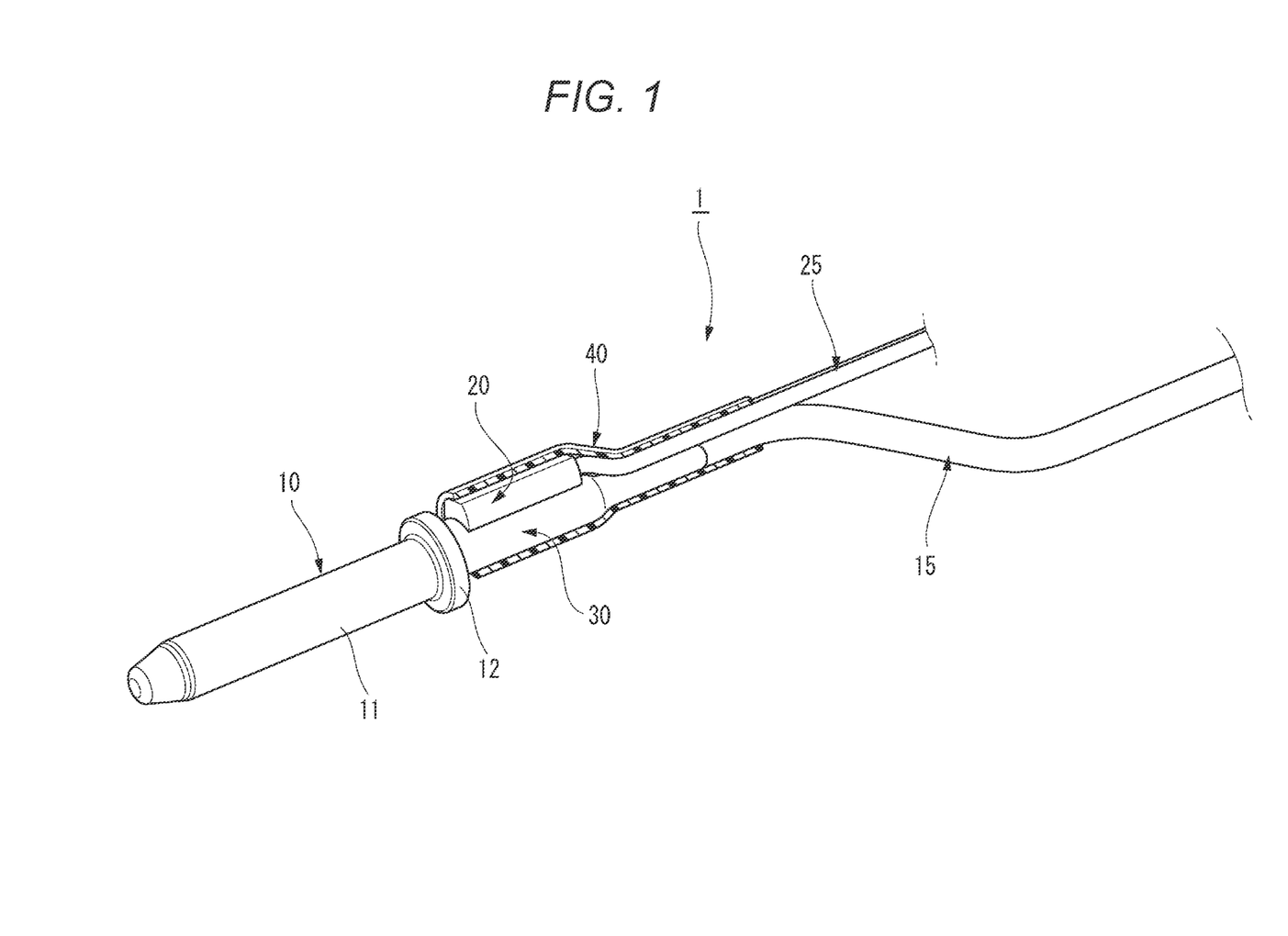
FIG. 1 is a partially cutaway perspective view showing a terminal equipped electric wire according to an embodiment.
Figures 2A, 2B:
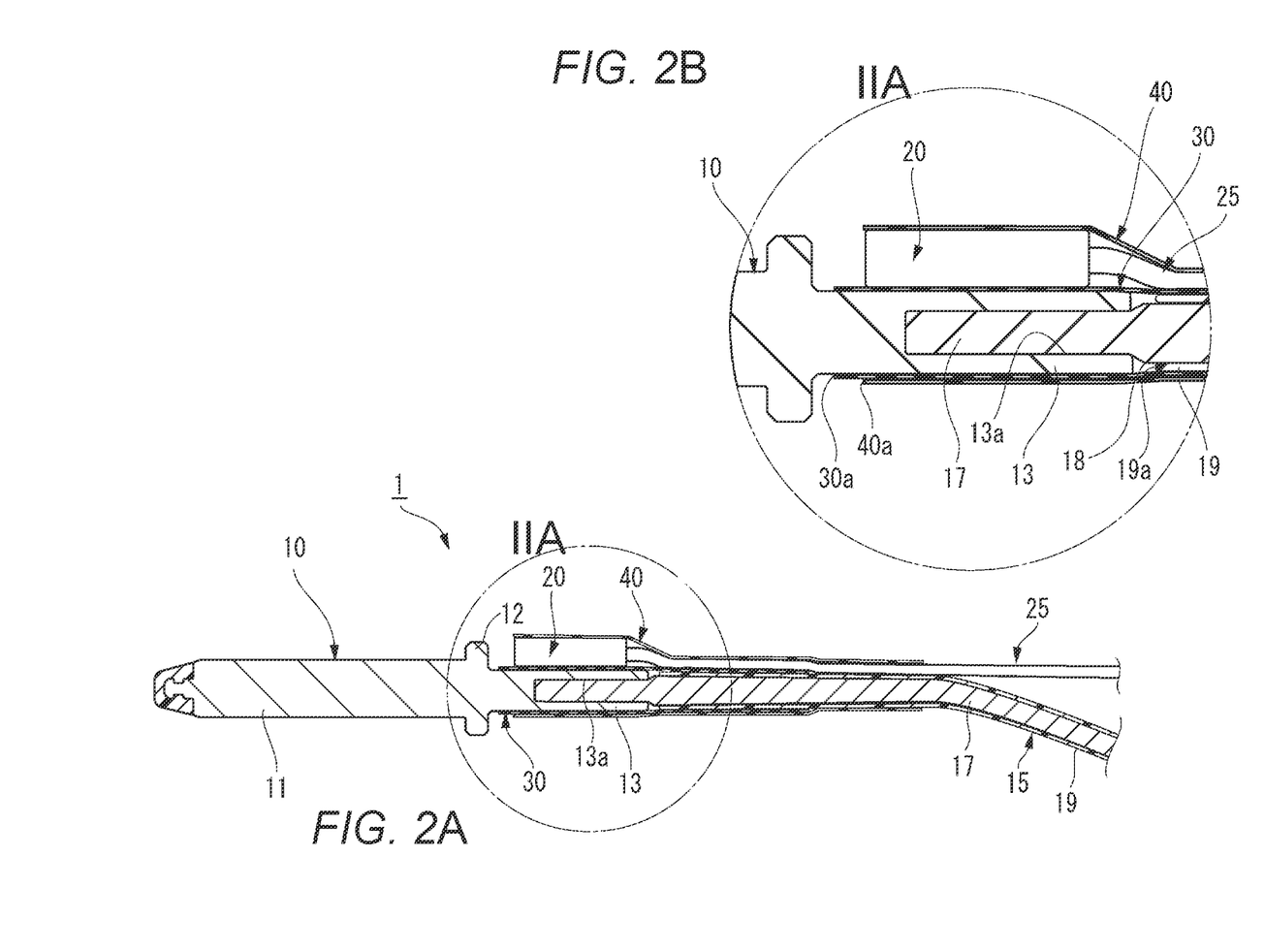
FIG. 2A is a longitudinal cross-sectional view showing the terminal equipped electric wire shown in FIG. 1.
FIG. 2B is an enlarged view of area IIA of FIG. 2A showing a main part of the terminal equipped electric wire.
Figure 3:
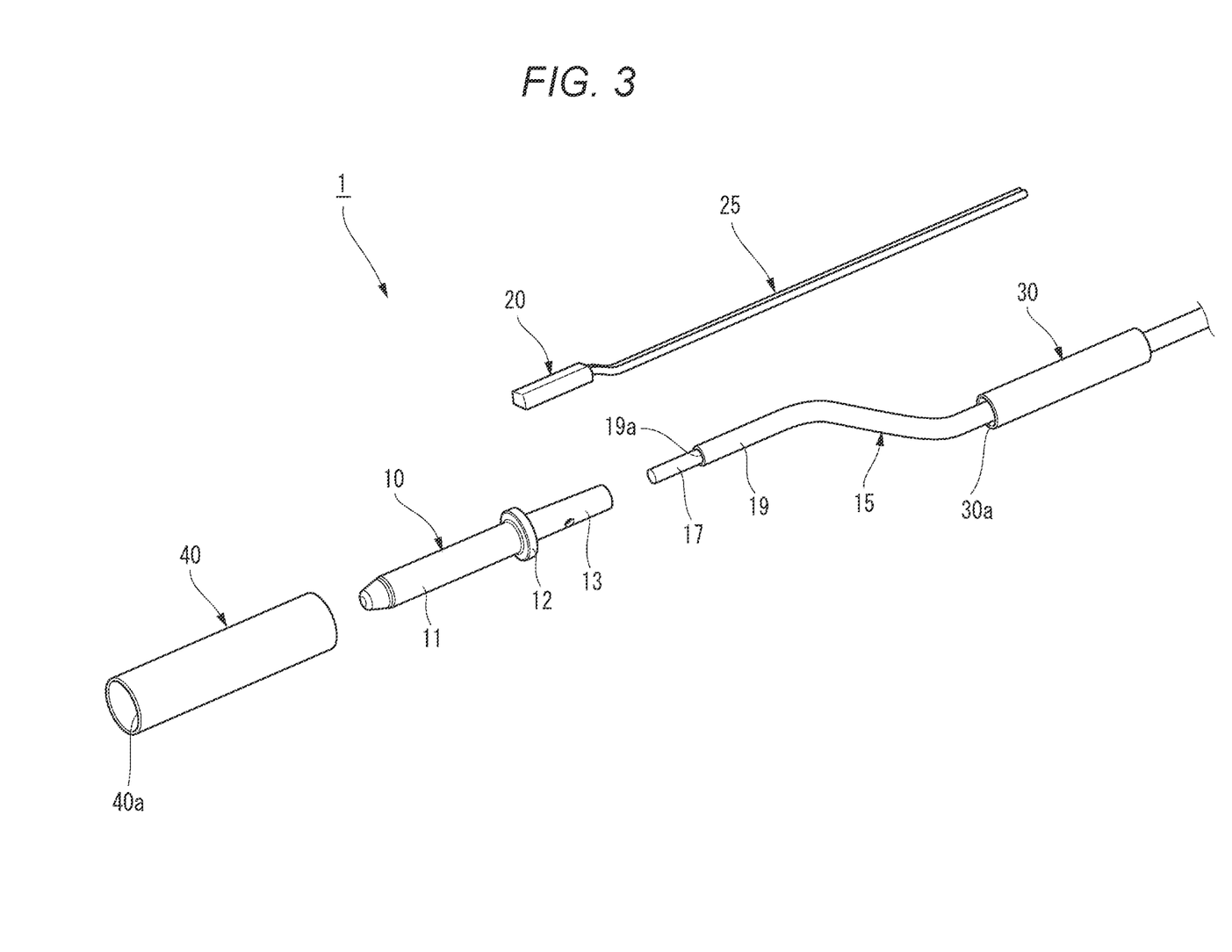
FIG. 3 is an exploded perspective view showing the terminal equipped electric wire shown in FIG. 1.

Hereinafter, exemplary embodiments of the present invention will be described in detail with reference to the drawings. FIG. 1 is a partially cutaway perspective view showing a terminal equipped electric wire 1 according to an embodiment. FIG. 2A is a longitudinal cross-sectional view showing the terminal equipped electric wire 1 shown in FIG. 1 and FIG. 2B is an enlarged view of area IIA of FIG. 2A showing a main part of the terminal equipped electric wire 1. FIG. 3 is an exploded perspective view showing the terminal equipped electric wire 1 shown in FIG. 1.

As shown in FIGS. 1 to 3, the terminal equipped electric wire 1 according to the embodiment mainly includes a terminal fitting 10, an electric wire 15, a sensor 20, a water stop shrinkable tube 30, and a sensor fixing shrinkable tube 40.

The electric wire 15 includes a long conductor 17 and an insulating sheath 19 that is an insulator covering the conductor 17. The terminal fitting 10 is attached to an end portion of the electric wire 15. The end portion is processed in advance to be in a state where the insulating sheath 19 is peeled off from a portion of the conductor 17 for a predetermined length, that is, a state where the portion of the conductor 17 for the predetermined length extends out of an end portion 19a of the insulating sheath 19 as an exposed portion 18. The conductor 17 adopts a wire member formed of, for example, a conductive metal containing copper or aluminum as a main component. In the present embodiment, the conductor 17 adopts a copper alloy containing copper as a main component. The conductor 17 may be a stranded wire having a plurality of strands, or a single wire.

The terminal fitting 10 according to the present embodiment is a male terminal formed into a substantially cylindrical shape by cutting the conductive metal. The terminal fitting 10 may be formed by means of pressing (punching or bending) a metal plate of a conductive metal (copper, a copper alloy, or the like).

Now referring to FIG. 3, the terminal fitting 10 has, at a front side (a left side in the figure), a terminal connection portion 11 to which a counterpart terminal fitting (female terminal) (not shown) is to be electrically connected. The terminal connection portion 11 has a columnar shape. The terminal fitting 10 has, at a rear side (a right side in the figure), an electric wire connection portion 13 to which the conductor 17 (the exposed portion 18) of the electric wire 15 is connected. The electric wire connection portion 13 has a cylindrical shape. A flange-shaped stopper 12 formed at an intermediate portion of the terminal fitting 10 in an insertion direction (i.e. longitudinal direction) restricts insertion of the terminal connection portion 11 into the counterpart terminal fitting.

Now referring to FIGS. 2A and 2B, the electric wire connection portion 13 is formed into a closed barrel that is opened at a rear end with a conductor insertion hole 13a into which a tip end portion of the conductor 17 is inserted, and the conductor 17 of the electric wire 15 is press-bonded to the electric wire connection portion 13 by crimping. The conductor insertion hole 13a runs in a longitudinal direction of the electric wire connection portion 13. After the conductor 17 (the exposed portion 18) of the electric wire 15 is inserted into the conductor insertion hole 13a of the electric wire connection portion 13 of the terminal fitting 10, the conductor 17 can be press-bonded to the electric wire connection portion 13 by crimping the electric wire connection portion 13. When the terminal fitting 10 is formed by press processing a metal plate, the electric wire connection portion 13 may be formed into a B crimp in which the conductor 17 of the electric wire 15 is press-bonded by a pair of crimping pieces. The end portion 19a of the insulating sheath 19 may be inserted into the electric wire connection portion 13 together with the exposed portion 18.

The sensor 20 according to the present embodiment is a thermistor having a thermistor element for detecting a temperature, and is formed into a substantially rectangular parallelepiped shape in which the thermistor element is covered with a resin. A detection line 25 connected to the thermistor element is drawn out from a rear end of the sensor 20. Furthermore, the sensor 20 may be a sensor that detects a state such as humidity and vibration.

The water stop shrinkable tube 30 and the sensor fixing shrinkable tube 40 according to the present embodiment are tubular members manufactured from various thermoplastic materials such as polyolefin, fluoropolymer (FEP, PTFE, Kynar, or the like). PVC, neoprene, silicone elastomer, and Viton. The water stop shrinkable tube 30 and the sensor fixing shrinkable tube 40 shrink when heat is applied from a hot air gun or the like, and is brought into close contact with members (such as the terminal fitting 10 and the sensor 20) inside the water stop shrinkable tube 30 and the sensor fixing shrinkable tube 40 along outer shapes of the members.

The water stop shrinkable tube 30 according to the present embodiment has an inner diameter larger than an outer diameter of the electric wire connection portion 13 of the terminal fitting 10. The color of the water stop shrinkable tube 30 is, for example, translucent. The color of the water stop shrinkable tube 30 may be other colors. When heat is applied, the water stop shrinkable tube 30 shrinks to have an inner diameter smaller than an outer diameter of the electric wire 15. Then, as shown in FIGS. 2A and 2B, the shrunk water stop shrinkable tube 30 covers the exposed portion 18 of the conductor 17 extending out of the end portion 19a of the insulating sheath 19 of the electric wire 15 connected to the electric wire connection portion 13. The water stop shrinkable tube 30 stops water, i.e., the shrunk water stop shrinkable tube 30 covers an exposed portion 18 of the conductor 17 in a watertight manner. The water stop shrinkable tube 30 may integrally cover a part of the electric wire connection portion 13, the part of the electric wire connection portion 13 including the rear end portion of the electric wire connection portion 13 and a part of the insulating sheath 19, the part of the insulating sheath 19 including the end portion 19a. In other words, the water stop shrinkable tube 30 may cover the electric wire connection portion 13 connected to the exposed portion 18. The water stop shrinkable tube 30 may also cover the end portion 19a of the insulating sheath 19 altogether.

Here, since the electric wire connection portion 13 according to the present embodiment is formed into a closed barrel, usually, it is necessary for the water stop shrinkable tube 30 to cover at least the exposed portion 18 of the conductor 17 that is exposed between an opening end of the conductor insertion hole 13a and the end portion 19a of the insulating sheath 19. However, in the terminal equipped electric wire 1 according to the present embodiment, since the sensor 20 needs to be positioned on an outer peripheral side of the electric wire connection portion 13 and needs to be disposed on an outer surface of the water stop shrinkable tube 30, a front end 30a of the water stop shrinkable tube 30 extends to a vicinity of (near, towards) the stopper 12. When the electric wire connection portion 13 is formed into the B crimp, the water stop shrinkable tube 30 may be configured to stop water by covering the conductor 17 up to a front side of the crimping piece where a tip end portion of the conductor 17 is exposed.

The sensor fixing shrinkable tube 40 according to the present embodiment has an inner diameter larger than an outer diameter obtained by integrating the electric wire connection portion 13 of the terminal fitting 10 and the sensor 20. The color of the sensor fixing shrinkable tube 40 is, for example, black. The color of the sensor fixing shrinkable tube 40 may be other colors. When heat is applied, the sensor fixing shrinkable tube 40 shrinks to have an inner diameter smaller than the outer diameter of the electric wire 15. Then, as shown in FIGS. 1 and 2, the shrunk sensor fixing shrinkable tube 40 covers and fixes the sensor 20, which is disposed on an outer surface of the water stop shrinkable tube 30 in a contacting manner. Of the sensor 20 fixed by the sensor fixing shrinkable tube 40, an entirety of a surface facing the outer surface of the water stop shrinkable tube 30 does not necessarily have to be in contact with the outer surface of the water stop shrinkable tube 30. In other words, at least a part of the surface of the sensor 20 facing the outer surface of the water stop shrinkable tube 30 contacts the outer surface of the water stop shrinkable tube 30. The entirety of the surface of the sensor 20 facing the outer surface of the water stop shrinkable tube 30 may contact the outer surface of the water stop shrinkable tube 30.

Here, in the terminal equipped electric wire 1 according to the present embodiment, the sensor fixing shrinkable tube 40 has a sufficient length so that the detection line 25 drawn out from the sensor 20, the electric wire 15 drawn out from the electric wire connection portion 13, and the sensor 20 can be held altogether and fixed to resist an electric wire tensile force.

Figure 4A:
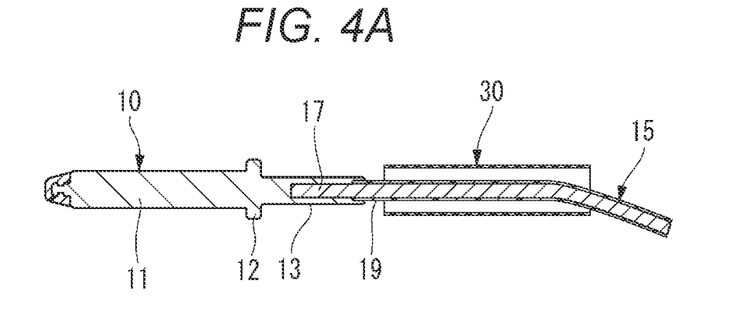
FIGS. 4A to 4D are longitudinal cross-sectional views showing a method of fixing a sensor in the terminal equipped electric wire shown in FIG. 1.

Next, a method of fixing the sensor in the terminal equipped electric wire 1 according to the present embodiment will be described. FIGS. 4A to 4D are longitudinal cross-sectional views showing the method of fixing the sensor in the terminal equipped electric wire 1 shown in FIG. 1. First, as shown in FIG. 4A, a portion of the conductor 17 (see FIG. 3) for a predetermined length is inserted into the conductor insertion hole 13a of the electric wire connection portion 13. The portion of the conductor 17 extends out of the end portion 19a of the insulating sheath 19 at an end portion of the electric wire 15, which has already been passed through the water stop shrinkable tube 30. Thereafter, the electric wire connection portion 13 is crimped, and the conductor 17 is press-bonded to the electric wire connection portion 13.

Figure 4B:
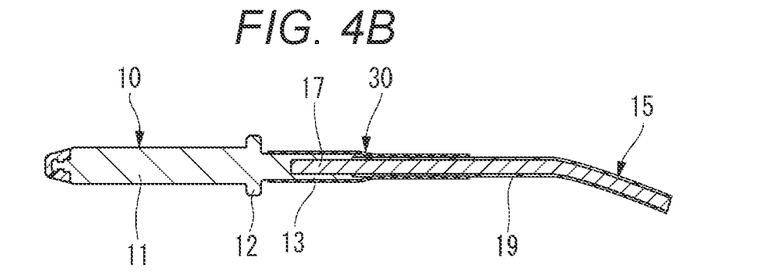

Next, the water stop shrinkable tube 30 is moved to a terminal front side (a left side in the figure) so as to cover the electric wire connection portion 13 and the exposed portion 18 of the conductor 17 connected to the electric wire connection portion 13. Then, as shown in FIG. 4B, when the water stop shrinkable tube 30 is heated and shrunk, the water stop shrinkable tube 30 has a substantially circular cross-sectional shape, and the water stop shrinkable tube 30 can cover and seal the exposed portion 18 of the conductor 17 extending out of the end portion 19a of the insulating sheath 19 of the electric wire 15 without a gap.

Figure 4C:
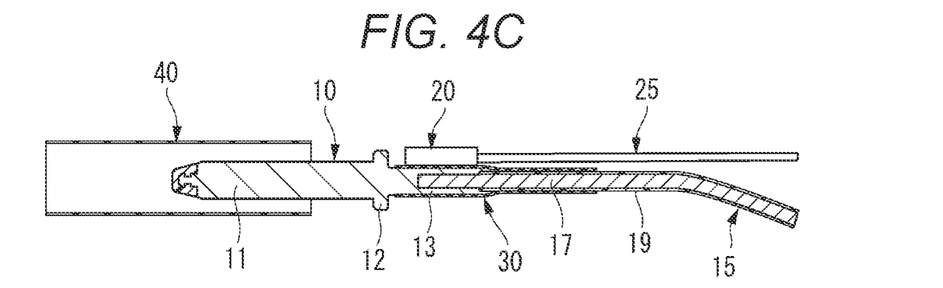
Figure 4D:
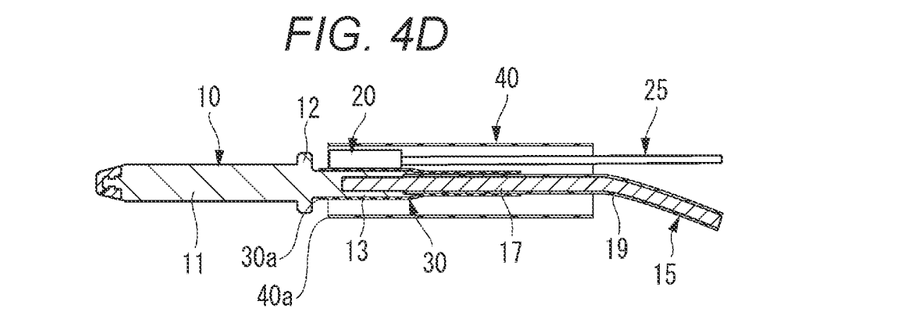

Next, as shown in FIG. 4C, the sensor 20 is positioned on the outer peripheral side of the electric wire connection portion 13 and is disposed on the outer surface of the water stop shrinkable tube 30 in a contacting manner. Then, the sensor fixing shrinkable tube 40 is attached from the terminal front side (the left side in the figure) of the terminal fitting 10. As shown in FIG. 4D, the sensor fixing shrinkable tube 40 is disposed to cover the sensor 20 disposed on the outer surface of the water stop shrinkable tube 30 and a portion of the detection line 25 drawn out from the sensor 20.

At this time, a front end 40a of the sensor fixing shrinkable tube 40 that covers the sensor 20 is positioned at a terminal rear side (a right side in the figure) relative to the front end 30a of the water stop shrinkable tube 30 (see FIGS. 2A and 2B). In other words, the front end 40a of the sensor fixing shrinkable tube 40 is, when the sensor fixing shrinkable tube 40 is disposed on the sensor 20 and the portion of the detection line 25, positioned further in the terminal rear side than the front end 30a of the water stop shrinkable tube 30, or the front end 40a of the sensor fixing shrinkable tube 40 is positioned closer to the rear side of the terminal fitting 10, at which the electric wire connection portion 13 is provided, than the front end 30a of the water stop shrinkable tube 30. The sensor fixing shrinkable tube 40 may cover a part of the sensor 20 such that another part of the sensor 20 being different from the part of the sensor 20 is exposed to an outside. Therefore, the presence or absence of the water stop shrinkable tube 30 after assembly can be easily confirmed from the outside by positioning the front end 40a of the sensor fixing shrinkable tube 40 at the terminal rear side relative to the front end 30a of the water stop shrinkable tube 30. As a result, when the sensor 20 and the water stop shrinkable tube 30 are forgotten to be assembled, it can be easily found out from the external appearance and it is easy to perform a relevant inspection during manufacturing.

Then, when the sensor fixing shrinkable tube 40 is heated and shrunk, as shown in FIG. 1, the sensor 20 and the portion of the detection line 25 drawn out from the sensor 20 can be reliably fixed even when a cross-sectional shape of the sensor fixing shrinkable tube 40 is deformed. Therefore, according to the method of fixing the sensor in the terminal equipped electric wire 1 in the present embodiment, waterproofness in the electric wire connection portion 13 of the terminal fitting 10 and in the periphery of the electric wire connection portion 13 and holding reliability of the sensor 20 can be improved by overlapping and attaching the sensor fixing shrinkable tube 40 on the outer surface of the water stop shrinkable tube 30 that stops water in the electric wire connection portion 13 of the terminal fitting 10 and in the periphery of the electric wire connection portion 13.

Next, functions of the terminal equipped electric wire 1 having the above-described configuration will be described. In the terminal equipped electric wire 1 according to the present embodiment, the water stop shrinkable tube 30 has a substantially circular cross-sectional shape after shrinkage. The water stop shrinkable tube 30 is attached to cover the exposed portion 18 of the conductor 17 extending from the end portion 19a of the insulating sheath 19 of the electric wire 15 connected to the electric wire connection portion 13 of the terminal fitting 10. Therefore, a gap is less likely to occur between the water stop shrinkable tube 30 and the electric wire connection portion 13 of the terminal fitting 10 or the periphery of the electric wire connection portion 13, and it is easy to perform sealing by the water stop shrinkable tube 30 for corrosion prevention, water stoppage, and the like.

The sensor fixing shrinkable tube 40 that covers and fixes the sensor 20 on the outer surface of the water stop shrinkable tube 30 has a deformed cross-sectional shape after shrinkage, and a gap may be generated between the sensor fixing shrinkable tube 40 and the electric wire connection portion 13 of the terminal fitting 10 or the periphery of the electric wire connection portion 13. However, it is for attaching and fixing the sensor 20 to the terminal fitting 10 that the sensor fixing shrinkable tube 40 is used, and sealing function is not required. It is required for the sensor fixing shrinkable tube 40 to have a predetermined holding force.

Therefore, according to the terminal equipped electric wire 1 in the present embodiment, waterproofness in the electric wire connection portion 13 of the terminal fitting 10 and in the periphery of the electric wire connection portion 13 and holding reliability of the sensor 20 can be improved by overlapping and assembling the sensor fixing shrinkable tube 40 on the outer surface of the water stop shrinkable tube 30 that stops water in the electric wire connection portion 13 of the terminal fitting 10 and in the periphery of the electric wire connection portion 13.

The sensor 20 disposed on the outer surface of the water stop shrinkable tube 30 has high adhesion compared with a case where the sensor 20 is directly attached to the electric wire connection portion 13 of the terminal fitting 10. That is, since the water stop shrinkable tube 30 is attached to the electric wire connection portion 13 and the periphery thereof, a diameter of the electric wire connection portion 13 and the periphery thereof is increased for the thickness of the water stop shrinkable tube 30 and a contact area with the sensor 20 is increased. Since the sensor 20 is attached to the electric wire connection portion 13 and the periphery thereof via the water stop shrinkable tube 30 having elasticity, a gap is less likely to occur between the sensor 20 and the electric wire connection portion 13 or the periphery thereof. Therefore, adhesion of the sensor 20 to the electric wire connection portion 13 and the periphery thereof is improved. As a result, measurement accuracy of the sensor 20 can be improved, and a temperature of the terminal fitting 10 can be reliably detected.

In the terminal equipped electric wire 1 according to the present embodiment, the sensor 20 is positioned on the outer peripheral side of the electric wire connection portion 13 and is disposed on the outer surface of the water stop shrinkable tube 30 in a contacting manner. Therefore, even when the conductor 17 of the electric wire 15 is press-bonded and connected to the electric wire connection portion 13 formed into a closed barrel, adhesion of the sensor 20 to the electric wire connection portion 13 of the terminal fitting 10 and the periphery of the electric wire connection portion 13 is improved. That is, since the water stop shrinkable tube 30 is attached to the electric wire connection portion 13 and the periphery thereof, unevenness of the outer peripheral surface of the electric wire connection portion 13 generated when the conductor 17 of the electric wire 15 is press-bonded and connected can be flattened and the sensor 20 can be brought into close contact with the electric wire connection portion 13 via the water stop shrinkable tube 30 without a gap. As a result, even when the conductor 17 of the electric wire 15 is press-bonded and connected to the electric wire connection portion 13, measurement accuracy of the sensor 20 can be improved, and a temperature of the terminal fitting 10 can be reliably detected.

In the terminal equipped electric wire 1 according to the present embodiment, the front end 40a of the sensor fixing shrinkable tube 40 is positioned at the terminal rear side relative to the front end 30a of the water stop shrinkable tube 30. The sensor fixing shrinkable tube 40 that covers and fixes the sensor 20 does not need to cover the entire sensor. When the sensor fixing shrinkable tube 40 covers and fixes only a part of the sensor 20, the presence or absence of the sensor 20 can be easily confirmed from the outside. Since the front end 40a of the sensor fixing shrinkable tube 40 is positioned at the terminal rear side relative to the front end 30a of the water stop shrinkable tube 30, the presence or absence of the water stop shrinkable tube 30 after assembly can also be easily confirmed from the outside. Therefore, when the sensor 20 and the water stop shrinkable tube 30 are forgotten to be assembled, it can be easily found out from the external appearance and it is easy to perform an inspection during manufacturing.

Further, in the terminal equipped electric wire 1 according to the present embodiment, since a color of the translucent water stop shrinkable tube 30 is different from a color of the black sensor fixing shrinkable tube 40, the water stop shrinkable tube 30 and the sensor fixing shrinkable tube 40 can be easily distinguished from each other, and an inspection can be more easily performed during manufacturing.

Figure 5:
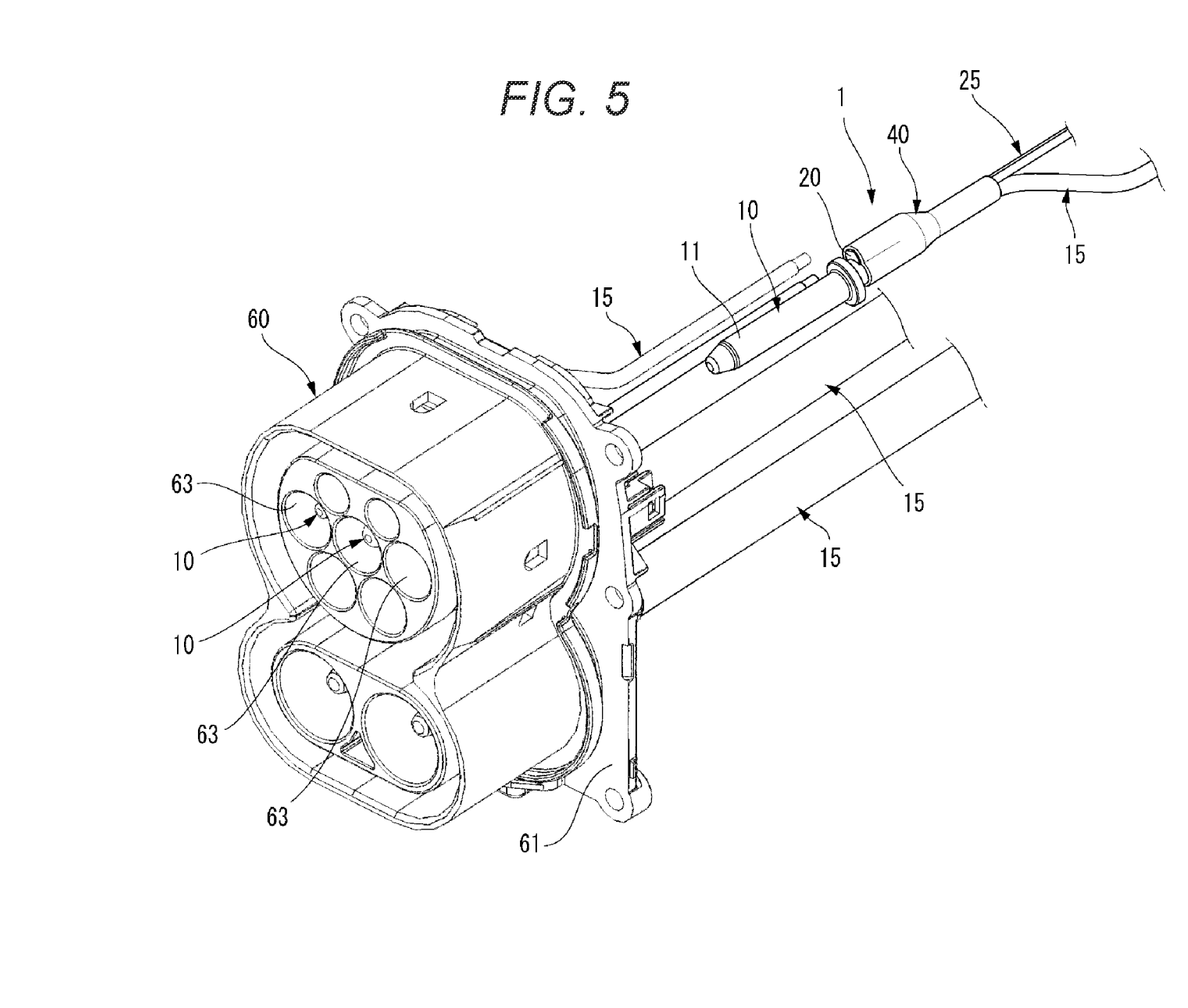
FIG. 5 is a perspective view showing a charging connector according to an embodiment that is provided with the terminal equipped electric wire shown in FIG. 1.

FIG. 5 is a perspective view showing a charging connector according to an embodiment that is provided with the terminal equipped electric wire 1 shown in FIG. 1. As shown in FIG. 5, the charging connector includes a housing 60 formed of a synthetic resin, and the charging connector is a vehicle-side charging connector. The housing 60 includes an attachment flange 61 for attaching the housing 60 to an attachment opening of the vehicle. Further, the housing 60 is provided with a plurality of terminal accommodating chambers 63 for accommodating a plurality of the terminal fittings 10.

Then, the terminal fitting 10 of the terminal equipped electric wire 1 is inserted into and accommodated in the terminal accommodating chamber 63 from a rear side (a right side in the figure) of the housing 60, and the sensor 20 described above is provided in the terminal fitting 10. Accordingly, the charging connector can detect a temperature during battery charging, and can assist avoiding problems that may occur during charging (for example, a temperature is too high).

Figure 6:
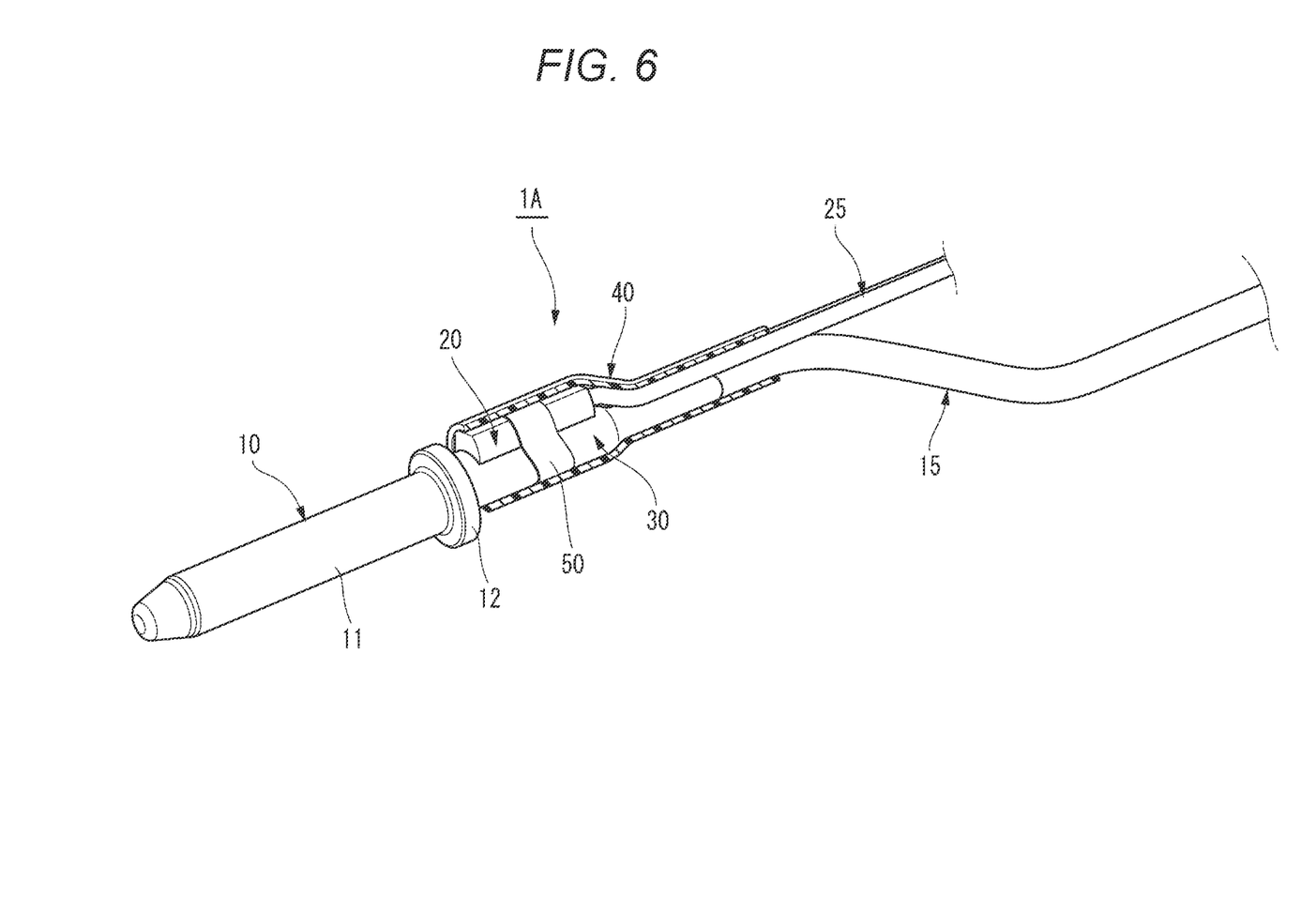
FIG. 6 is a partially cutaway perspective view showing a terminal equipped electric wire according to another embodiment.

Next, a terminal equipped electric wire 1A and a method of fixing a sensor according to another embodiment will be described. FIG. 6 is a partially cutaway perspective view showing the terminal equipped electric wire 1A according to another embodiment. As shown in FIG. 6, the terminal equipped electric wire 1A according to the another embodiment mainly includes the terminal fitting 10, the electric wire 15, the sensor 20, the water stop shrinkable tube 30, the sensor fixing shrinkable tube 40, and a temporary fixing member 50. The terminal equipped electric wire 1A has the same configuration as that of the terminal equipped electric wire 1 except that the terminal equipped electric wire 1A includes the temporary fixing member 50 such as an adhesive tape that temporarily fixes the sensor 20.

The terminal equipped electric wire 1A according to the another embodiment of the present invention includes the temporary fixing member 50 that temporarily fixes the sensor 20 disposed on the outer surface of the water stop shrinkable tube 30. That is, the sensor 20 disposed on the outer surface of the water stop shrinkable tube 30 is temporarily fixed by the temporary fixing member 50 before the sensor fixing shrinkable tube 40 attached to cover the sensor 20 is heated and shrunk. Therefore, the sensor 20 is not displaced on the water stop shrinkable tube 30 before the sensor fixing shrinkable tube 40 is assembled and fixed, and assembly workability is improved. The temporary fixing member 50 is not limited to an adhesive tape, and various temporary fixing members such as a rubber band can be used as long as the sensor 20 can be temporarily fixed.

Therefore, according to the terminal equipped electric wire 1, 1A and the method of fixing a sensor in the embodiments described above, waterproofness and holding reliability of the sensor 20 can be improved.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, a terminal equipped electric wire (1, 1A) includes an electric wire (15) including: a conductor (17) and an insulating sheath (19) covering the conductor (17), a part of the conductor (17) extending out of an end portion (19a) of the insulating sheath (19) being an exposed portion (18), a terminal fitting (10) having an electric wire connection portion (13) at a rear side of the terminal fitting (10), the electric wire connection portion (13) being connected to the exposed portion (18), a water stop shrinkable tube (30) covering the electric wire connection portion (13) connected to the exposed portion (18) in a watertight manner, a sensor (20) disposed on an outer surface of the water stop shrinkable tube (30), the sensor contacting the outer surface of the water stop shrinkable tube (30) and a sensor fixing shrinkable tube (40) covering and fixing the sensor (20) on the outer surface of the water stop shrinkable tube (30).

According to the terminal equipped electric wire having the above described configuration, the water stop shrinkable tube is attached to the electric wire to cover the exposed portion of the conductor extending out of the end portion of the insulating sheath of the electric wire connected to the electric wire connection portion of the terminal fitting, and the water stop shrinkable tube has a substantially circular cross-sectional shape after shrinkage. Therefore, a gap is less likely to occur between the water stop shrinkable tube and the electric wire connection portion of the terminal fitting or a periphery of the electric wire connection portion, and it is easy to perform sealing by the water stop shrinkable tube for corrosion prevention, water stoppage, and the like. The sensor fixing shrinkable tube that covers and fixes the sensor such as a thermistor disposed on the outer surface of the water stop shrinkable tube has a deformed cross-sectional shape after shrinkage, and a gap may be generated between the sensor fixing shrinkable tube and the electric wire connection portion of the terminal fitting or the periphery of the electric wire connection portion. However, the sensor fixing shrinkable tube is used to attach and fix the sensor to the terminal fitting, and sealing function is not required as long as the sensor fixing shrinkable tube has a required holding force. Therefore, according to the terminal equipped electric wire having the above configuration, waterproofness in the electric wire connection portion of the terminal fitting and in the periphery of the electric wire connection portion and sensor holding reliability of the sensor can be improved by overlapping and attaching the sensor fixing shrinkable tube on the outer surface of the water stop shrinkable tube that stops water in the electric wire connection portion of the terminal fitting and in the periphery of the electric wire connection portion. The sensor disposed on the outer surface of the water stop shrinkable tube has high adhesion compared with a case where the sensor is directly attached to the electric wire connection portion of the terminal fitting. That is, since the water stop shrinkable tube is attached to the electric wire connection portion and the periphery thereof, a diameter of the electric wire connection portion and the periphery thereof is increased and a contact area with the sensor is increased. Since the sensor is attached to the electric wire connection portion and the periphery thereof via the water stop shrinkable tube having elasticity, a gap is less likely to occur between the sensor and the electric wire connection portion or the periphery thereof. Therefore, adhesion of the sensor to the electric wire connection portion and the periphery thereof is improved. As a result, measurement accuracy of the sensor can be improved, and a state of the terminal fitting such as a temperature, vibration, and humidity can be reliably detected.

A part of the water stop shrinkable tube (30) may cover the electric wire connection portion (13). The sensor (20) may be disposed on the part of the water stop shrinkable tube (30).

According to the terminal equipped electric wire having the above configuration, even when the conductor of the electric wire is press-bonded and connected to the electric wire connection portion formed into a closed barrel or a B crimp, adhesion of the sensor to the electric wire connection portion of the terminal fitting and the periphery of the electric wire connection portion is improved. That is, since the water stop shrinkable tube is attached to the electric wire connection portion and the periphery thereof, unevenness of the outer peripheral surface of the electric wire connection portion generated when the conductor of the electric wire is press-bonded and connected can be flattened, and the sensor can be brought into contact with the electric wire connection portion via the water stop shrinkable tube in a pressed manner without a gap. As a result, even when the conductor of the electric wire is press-bonded and connected to the electric wire connection portion, measurement accuracy of the sensor can be improved, and a state of the terminal fitting such as a temperature, vibration, and humidity can be reliably detected.

The sensor fixing shrinkable tube (40) may cover apart of the sensor (20). Another part of the sensor (20) being different from the part of the sensor (20) may be exposed to an outside. A front end (40a) of the sensor fixing shrinkable tube (40) may be positioned closer to the rear side of the terminal fitting (10) than a front end (30a) of the water stop shrinkable tube (30).

According to the terminal equipped electric wire having the above configuration, the sensor fixing shrinkable tube that covers and fixes the sensor does not need to cover the entirety of the sensor. When the sensor fixing shrinkable tube covers and fixes a part of the sensor, the presence or absence of the sensor can be easily (visually) confirmed from the outside. Since the front end of the sensor fixing shrinkable tube is positioned further at the terminal rear side than the front end of the water stop shrinkable tube, the presence or absence of the water stop shrinkable tube after assembly can also be easily confirmed from the outside. Therefore, when the sensor and the water stop shrinkable tube are forgotten to be assembled, it can be easily found out from the external appearance and it is easy to perform a relevant inspection during manufacturing.

A color of the water stop shrinkable tube (30) may be different from a color of the sensor fixing shrinkable tube (40).

According to the terminal equipped electric wire having the above configuration, since the colors of the water stop shrinkable tube and the sensor fixing shrinkable tube are different, the water stop shrinkable tube and the sensor fixing shrinkable tube can be easily distinguished from each other, and an inspection can be more easily performed during manufacturing.

The terminal equipped electric wire (1A) may further include a temporary fixing member (50) configured to temporarily fix the sensor (20) on the outer surface of the water stop shrinkable tube (30).

According to the terminal equipped electric wire having the above configuration, the sensor disposed on the outer surface of the water stop shrinkable tube is temporarily fixed by the temporary fixing member such as an adhesive tape. Therefore, the sensor is not displaced on the water stop shrinkable tube before the sensor fixing shrinkable tube is assembled and fixed, and assembly workability is improved.

The electric wire connection portion (13) may include a conductor insertion hole (13a) at a rear end portion of the electric wire connection portion (13), the conductor insertion hole (13a) being configured such that the exposed portion (18) and the end portion (19a) of the insulating sheath (19) is inserted into the conductor insertion hole (13a), the conductor insertion hole (13a) extending in a longitudinal direction of the electric wire connection portion (13). The electric wire (15) may be connected to the electric wire connection portion (13) with the exposed portion (18) and the end portion (19a) of the insulating sheath (19) being accommodated in the conductor insertion hole (13a). The water stop shrinkable tube (30) may integrally cover a part of the electric wire connection portion (13), the part of the electric wire connection portion (13) including the rear end portion of the electric wire connection portion (13) and a part of the insulating sheath (19), the part of the insulating sheath (19) including the end portion (19a).

According to another aspect of the embodiments described above, a method of fixing a sensor includes connecting an exposed portion (18) of a conductor (17) of an electric wire (15) to an electric wire connection portion (13) of a terminal fitting (10), the electric wire connection portion (13) being at a rear side of the terminal fitting (10), the exposed portion (18) extending out of an end portion (19a) of an insulating sheath (19) of the electric wire (15), disposing a water stop shrinkable tube (30) on the electric wire (15) to cover the electric wire connection portion (13) connected to the exposed portion (18), heating the water stop shrinkable tube (30) such that the water stop shrinkable tube (30) covers the electric wire connection portion (13) in a watertight manner, disposing a sensor (20) on an outer surface of the water stop shrinkable tube (30) such that the sensor (20) contacts the outer surface of the water stop shrinkable tube (30), disposing a sensor fixing shrinkable tube (40) to cover the sensor disposed on the outer surface of the water stop shrinkable tube (30) and fixing the sensor on the outer surface of the water stop shrinkable tube (30) by heating the sensor fixing shrinkable tube (40).

According to the method of fixing a sensor having the above described configuration, the water stop shrinkable tube is attached to the electric wire to cover the exposed portion of the conductor extending out of the end portion of the insulating sheath of the electric wire connected to the electric wire connection portion of the terminal fitting, and when the water stop shrinkable tube is heated and shrunk, the cross section of the water stop shrinkable tube has a substantially circular shape, and the exposed portion of the conductor extending out of the end portion of the insulating sheath of the electric wire can be covered and sealed without a gap. Then, when the sensor fixing shrinkable tube attached to cover the sensor disposed on the outer surface of the water stop shrinkable tube is heated and shrunk, the sensor can be reliably fixed even when a cross-sectional shape of the sensor fixing shrinkable tube is deformed, i.e. the cross-sectional shape of the sensor fixing shrinkable tube has a non-circular shape. Therefore, according to the method of fixing a sensor having the above described configuration, waterproofness in the electric wire connection portion of the terminal fitting and in the periphery of the electric wire connection portion and holding reliability of the sensor can be improved by overlapping and assembling the sensor fixing shrinkable tube on the outer surface of the water stop shrinkable tube that stops water in the electric wire connection portion of the terminal fitting and in the periphery of the electric wire connection portion.

The method of fixing a sensor may further include positioning a front end (40a) of the sensor fixing shrinkable tube (40) closer to the rear side of the terminal fitting (10) than a front end (30a) of the water stopping shrinkable tube (30).

According to the method of fixing a sensor having the above described configuration, since the front end of the sensor fixing shrinkable tube is positioned at the terminal rear side relative to the front end of the water stop shrinkable tube, i.e., the front end of the sensor fixing shrinkable tube is positioned closer to the rear end of the terminal fitting, at which the electric w % ire connection portion is provided, than the front end of the water stop shrinkable tube, the presence or absence of the water stop shrinkable tube after assembly can be easily confirmed from the outside. Therefore, when the sensor and the water stop shrinkable tube are forgotten to be assembled, it can be easily found out from the external appearance and it is easy to perform an inspection during manufacturing.

The method of fixing a sensor may further include temporarily fixing the sensor (20) on the outer surface of the water stop shrinkable tube (30) by a temporary fixing member (50).

According to the method of fixing a sensor having the above described configuration, the sensor disposed on the outer surface of the water stop shrinkable tube is temporarily fixed by the temporary fixing member, such as an adhesive tape, before the sensor fixing shrinkable tube attached to cover the sensor is heated and shrunk to fix the sensor. Therefore, the sensor is not displaced on the water stop shrinkable tube before the sensor fixing shrinkable tube is attached and fixed, and assembly workability is improved.

What is claimed is:
1. A terminal equipped electric wire including:
an electric wire including: a conductor; and an insulating sheath covering the conductor, a part of the conductor extending out of an end portion of the insulating sheath being an exposed portion;
a terminal fitting having an electric wire connection portion at a rear side of the terminal fitting, the electric wire connection portion being connected to the exposed portion;
a water stop shrinkable tube covering the electric wire connection portion connected to the exposed portion in a watertight manner;
a sensor disposed on an outer surface of the water stop shrinkable tube, the sensor contacting the outer surface of the water stop shrinkable tube; and
a sensor fixing shrinkable tube covering and fixing the sensor on the outer surface of the water stop shrinkable tube.

2. The terminal equipped electric wire according to claim 1,
wherein a part of the water stop shrinkable tube covers the electric wire connection portion, and
wherein the sensor is disposed on the part of the water stop shrinkable tube.

3. The terminal equipped electric wire according to claim 1,
wherein the sensor fixing shrinkable tube covers a part of the sensor,
wherein another part of the sensor being different from the part of the sensor is exposed to an outside, and wherein a front end of the sensor fixing shrinkable tube is positioned closer to the rear side of the terminal fitting than a front end of the water stop shrinkable tube.

4. The terminal equipped electric wire according to claim 3, wherein a color of the water stop shrinkable tube is different from a color of the sensor fixing shrinkable tube.

5. The terminal equipped electric wire according to claim 1, further including:
a temporary fixing member configured to temporarily fix the sensor on the outer surface of the water stop shrinkable tube.

6. The terminal equipped electric wire according to claim 1,
wherein the electric wire connection portion includes a conductor insertion hole at a rear end portion of the electric wire connection portion, the conductor insertion hole being configured such that the exposed portion and the end portion of the insulating sheath is inserted into the conductor insertion hole, the conductor insertion hole extending in a longitudinal direction of the electric wire connection portion,
wherein the electric wire is connected to the electric wire connection portion with the exposed portion and the end portion of the insulating sheath being accommodated in the conductor insertion hole, and
wherein the water stop shrinkable tube integrally covers: a part of the electric wire connection portion, the part of the electric wire connection portion including the rear end portion of the electric wire connection portion; and a part of the insulating sheath, the part of the insulating sheath including the end portion.

7. A method of fixing a sensor including:
connecting an exposed portion of a conductor of an electric wire to an electric wire connection portion of a terminal fitting, the electric wire connection portion being at a rear side of the terminal fitting, the exposed portion extending out of an end portion of an insulating sheath of the electric wire;
disposing a water stop shrinkable tube on the electric wire to cover the electric wire connection portion connected to the exposed portion;
heating the water stop shrinkable tube such that the water stop shrinkable tube covers the electric wire connection portion in a watertight manner;
disposing a sensor on an outer surface of the water stop shrinkable tube such that the sensor contacts the outer surface of the water stop shrinkable tube;
disposing a sensor fixing shrinkable tube to cover the sensor disposed on the outer surface of the water stop shrinkable tube; and
fixing the sensor on the outer surface of the water stop shrinkable tube by heating the sensor fixing shrinkable tube.

8. The method of fixing a sensor according to claim 7, further including
positioning a front end of the sensor fixing shrinkable tube closer to the rear side of the terminal fitting than a front end of the water stopping shrinkable tube.

9. The method of fixing a sensor according to claim 7, further including
temporarily fixing the sensor on the outer surface of the water stop shrinkable tube by a temporary fixing member.

* * * * *